United States Patent [19]

Henrichsen

[11] 4,005,541
[45] Feb. 1, 1977

[54] FISHING LEADER TENDER

[76] Inventor: Robert Brent Henrichsen, 1883 Zenda Way, Salt Lake City, Utah 84121

[22] Filed: Aug. 22, 1975

[21] Appl. No.: 606,875

[52] U.S. Cl. .......................................... 43/57.5 A
[51] Int. Cl.² ..................................... A01K 97/06
[58] Field of Search .................... 43/57.5 A, 57.5 R

[56] References Cited

UNITED STATES PATENTS

| 578,458 | 3/1897 | Knierieman | 43/57.5 R |
| 1,578,631 | 3/1926 | Bolton | 43/57.5 A |
| 2,041,231 | 5/1936 | Collins | 43/57.5 A |
| 2,836,005 | 5/1958 | Jerdee | 43/57.5 A |
| 2,899,770 | 8/1959 | Bartlett | 43/57.5 R |

*Primary Examiner*—Louis G. Mancene
*Assistant Examiner*—Daniel J. Leach
*Attorney, Agent, or Firm*—Trask & Britt

[57] ABSTRACT

A fishing leader tender having an elongated base and a pair of hook engaging blocks attached near one end of said base and tension spring means attached near the other end is disclosed. The fishing leader tender is particularly useful for holding ganged hooks wherein more than one hook is tied to one leader. The base is flat and preferably rigid with a clip attached to the spring means to engage the loop of the leader. The blocks have soft hook engaging means, such as cork, on an edge opposite the spring. The hook engaging blocks are preferably movable longitudinally so that they may be adjusted to hold a particular length of leader. The leader tender may be hinged in the center to fold more compactly and may be incorporated into a fishing box, either externally or internally. The base may be equipped with a pair of elongated legs and a rod holder to form a rod tender.

10 Claims, 10 Drawing Figures

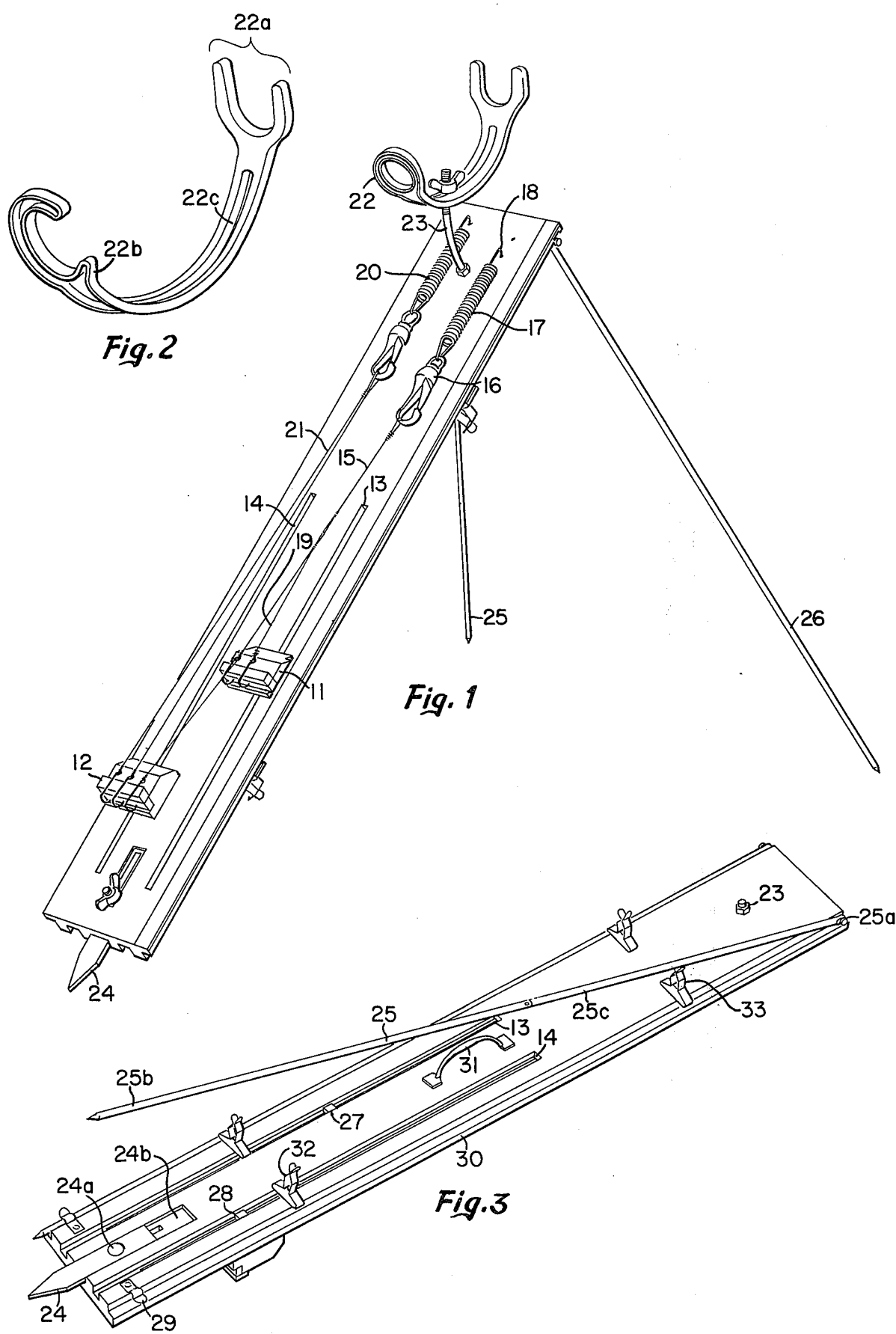

FISHING LEADER TENDER

BACKGROUND OF INVENTION

1. Field

This invention relates to devices for holding fishing leaders with hooks attached in place in a condition so that the leader and hooks will not become snarled. A particular advantage is having leaders and hooks pretied prior to undertaking a fishing expedition. The purpose of the leader is to have a lesser breaking strength in the lines so if a hook becomes snagged the line will break at the hook and the line will not be lost.

2. Prior Art

A variety of types of fishing hook holders for snelled hooks and for hooks having leaders attached are known in the art.

Typical of the known fishing hook holders are those described in U.S. Pat. Nos. 1,578,631 and 2,448,728, wherein the devices are flat and elongated and have hook engaging means at the base with each snelled hook attached to a longitudinally movable post. In the first mentioned patent the device is slotted at the base so that each slot accommodates one hook and there are a matching number of posts. In the device in the second mentioned patent there are holes in the base to accommodate each hook with a matching number of posts.

Other types of devices are disclosed in the Collins, U.S. Pat. No. 2,041,231, the Freeman, U.S. Pat. No. 3,172,228 and the Porter, U.S. Pat. No. 1,715,567. In each of these devices a large number of spring members are attached near one end with hook receiving means located at the other end of the elongated flat device. The hook engaging means are immobile so location of the springs at the opposite end may be adjusted. The devices are constructed so that there are springs on either side of the device and hooks are attached on both sides of the device. These devices are constructed particularly to hold the hooks attached to one leader.

The fishing hook container of Lester, U.S. Pat. No. 2,600,665, has spring means at one end with a plurality of rods near the other end of the device. The loop of the leader may be engaged with the spring while the hook loops over one of the plurality of rods which are longitudinally spaced from the spring. The rods are stationary.

The device of Jerdee, U.S. Pat. No. 2,836,005, provides stationary plugs to engage the loop of a leader and has hook engaging means which is attached to the base by compression spring means.

The device disclosed in U.S. Pat. No. 2,574,908 of Buicke is a holder for leader lines wherein the leader has loops at each end. The device has loop engaging means on opposite sides of the device and holds the leader by hooking one loop over one loop engaging means passing the leader about the end of the device and looping the loop at the opposite end over the loop engaging means on the opposite side of the device.

While the devices of the prior art perform the function of holding single hooks attached to a single leader, none of the devices are particularly well adapted for handling gang hooks attached to a single leader.

OBJECTS OF THE INVENTION

An object of the instant invention is to provide a fishing hook leader tender having capability of readily handling both single snelled hooks and ganged hooks.

It is a further object of the instant invention to provide a fishing hook leader tender which is very compact and prevents the leaders from being snarled or snagged.

A further object of the instant invention is to provide a fishing hook leader tender having means to act as a fishing rod tender.

A further object of the invention is to provide a folding fishing hook leader tender incorporated externally or internally with a tackle box.

A further object of the invention is to provide a fishing hook leader tender which encourages a fisherman to prepare fishing leaders of proper strength prior to fishing, thereby reducing visible and invisible pollution of lakes and streams.

BRIEF DESCRIPTION OF THE DRAWINGS

Reference is made herein to the following figures wherein:

FIG. 1 is a perspective view of a leader tender having a pair of folding legs and a rod holder attachment.

FIG. 2 is a plan view of a rod holder.

FIG. 3 is a perspective view of a reverse side of the leader tender of FIG. 1 illustrating the rod carrying means.

DESCRIPTION OF INVENTION

Figure 7:
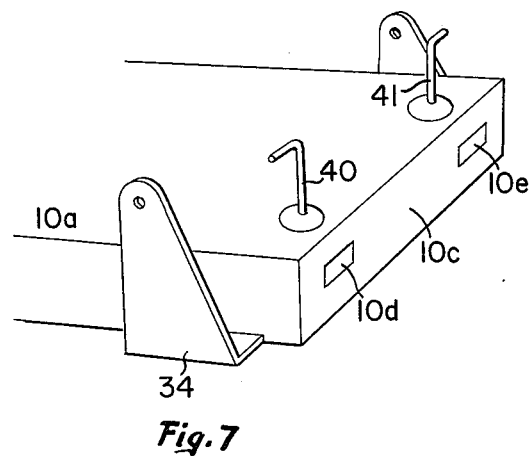
FIG. 7 is a perspective view of the hinge arrangement of a folding leader tender.

A fishing hook leader tender comprising an elongated base having a length substantially greater than its width with a pair of hook engaging blocks near one end of said base, said blocks spaced longitudinally from one another and having soft hook engaging means and having tension spring means attached near the opposite end of said base to hold the loop of a leader has been invented.

Preferred embodiments of the device are illustrated in the drawings attached hereto. In FIG. 1 the elongated base 10 is shown with a pair of blocks 11 and 12 spaced laterally and longitudinally from one another and a spring which is movable longitudinally. Blocks 11 and 12 are slidable along grooves 13 and 14 which may pass through the base or merely be grooved within the base with a clip holding the blocks 11 and 12 in place. The movable feature of blocks 11 and 12 permits the blocks to be adjusted to accommodate various lengths of leaders. The blocks are firmly clamped to the base in each new position.

As illustrated in FIG. 1 the device is particularly adapted to handling a ganged hook wherein a single leader 15 is attached to clip 16 which is attached to spring 17 which is secured by a lug or hook 18 to the upper portion of the base. The single leader 15 has a pair of hooks thereon in a ganged arrangement wherein one hook is attached by separate leader 19 so that the hooks will be different depths when the line is in the water. A ganged hook arrangement is usually utilized in lake fishing wherein a weight is attached to the line so that the weight will sink the line to the bottom and the bait on the hooks will be sufficiently light so that the hooks will float off the bottom at different depths. Another spring 20 is attached to the base to accommodate a single leader 21 having a single hook attached thereto.

The device illustrated in FIG. 1 has a rod holder 22 located near one end of the rigid elongated base, the rod holder 22 being located near the end adjacent springs 18 and 20, a preferred location. A rod holder 22 is removably attached to the base by a bolt 23. As illustrated in FIG. 1, a rod holder is curved so that its yoke can hold a portion of the rod while the handle of the rod goes through a hole in the rear of a rod holder. The rod holder is further depicted in FIG. 2.

Anchor spike 24 slidably projects from the end of the rigid base opposite the rod holder attachment. The spike slides along the base so that it can be extended beyond the base and used to anchor the rigid base into place. A pair of elongated legs 25 and 26 are typically attached to the longer edges of the rigid base at the end near the rod holder. As further illustrated in FIG. 3, these legs are about the same length as the rigid base 10 and are folded along the base when not in use so that they do not extend or project from the base. When in use the legs are unclipped from the base and form into position at about right angles to the rigid base 10 as illustrated in FIGS. 1 and 3. The legs have sharpened ends so that they may be driven into the ground so that the two legs and spike form a secure tripod arrangement to present a stable, steady base for rod holder 22.

The rod holder is illustrated in a plan view in FIG. 2. Yoke 22a and the partially-open ring-like end 22b secures the handle of the fishing rod. The open ring 22b permits the rod handle to be easily slid into the rod holder. A slotted opening 22c is provided to pass over the bolt secured to the base of the combination fishing leader pole tender.

The opposite side of the device illustrated in FIG. 1 is shown in FIG. 3 wherein the wing nut members 27 and 28 fit in bolts which pass through slots 13 and 14 to secure blocks 11 and 12 to the base 10. Spike 24 is illustrated with a wing nut 24a holding it in an extended position in groove 24b where it may be retracted in a non-extending position. Leg 25 is illustrated as being pivotally attached by bolt means 25a at its upper end and held in place by clip 29 attached along the edge of the base near the short edge adjacent spike 24. The edge of the base has a ledge 30 cut therein extending along the length of the side of the base to form a support for leg 25 when it is in a folded position. Handle 31 provides means for carrying the elongated leader tender-rod-tender combination since the length of the device is usually about 30 to 40 inches. Bolt 23 passes through the upper edge of the base end. U-shaped clamps 32 and 33 are located near the edge of the base in FIG. 3 to hold a disassembled fishing rod. The ends of the base of the U-shaped clamps extend over the edge of ledge 30 slightly to assist in giving a firm support for the leg 25 in the folded or carrying position. Leg 25 is illustrated as being an extendable leg wherein the bottom portion is a tubular member which has a slightly larger diameter than the upper portion 25c so that the bottom portion will slide over the upper portion and thus have two useful lengths, that is, one length wherein the lower portion 25b is telescoped over the upper portion 25c to form a shorter leg or in an extended position where lower portion 25b is extended to form a leg which can be substantially longer than the length of the base. This is desirable since most fishing is done along the banks of streams and lakes and the bank is usually sloping to the water's edge. Since it is necessary to have a pole tender near the water and it is very desirable to have front legs which can be extended to a long length to accommodate for the sloping bank.

Figure 4:
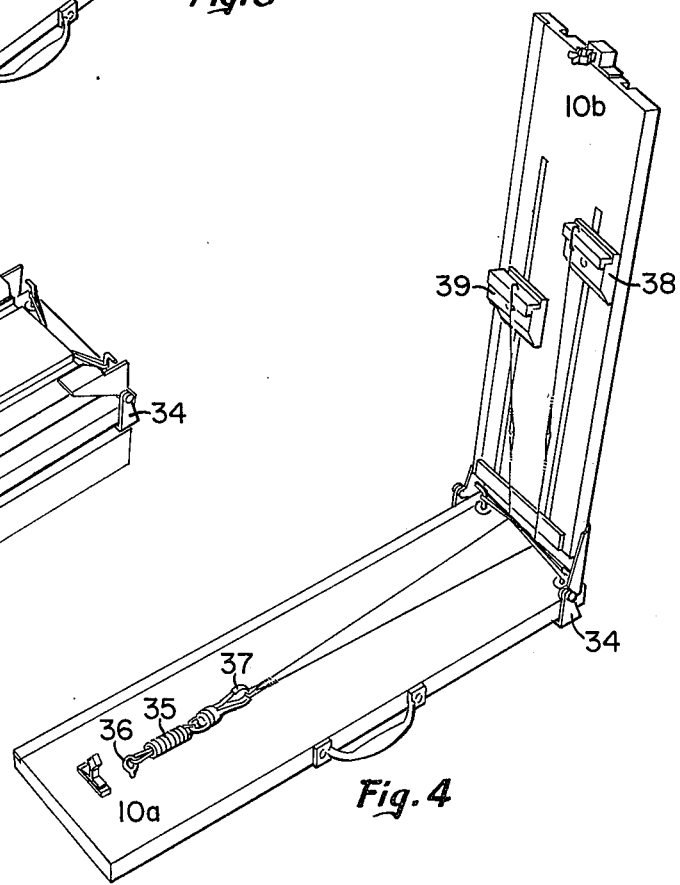
FIG. 4 is a perspective view of a folding leader tender in a semi-folded position.

Another version of the leader tender is illustrated in FIG. 4 wherein the base is divided laterally into two elongated sections 10a and 10b with hinge means 34 connecting the two sections to form a folding leader tender. A spring member 35 attached to a post 36 is illustrated with a clip 37 holding a pair of leaders with hooks embedded in blocks 38 and 39 which are similar to the blocks illustrated in FIG. 1.

Figure 5:
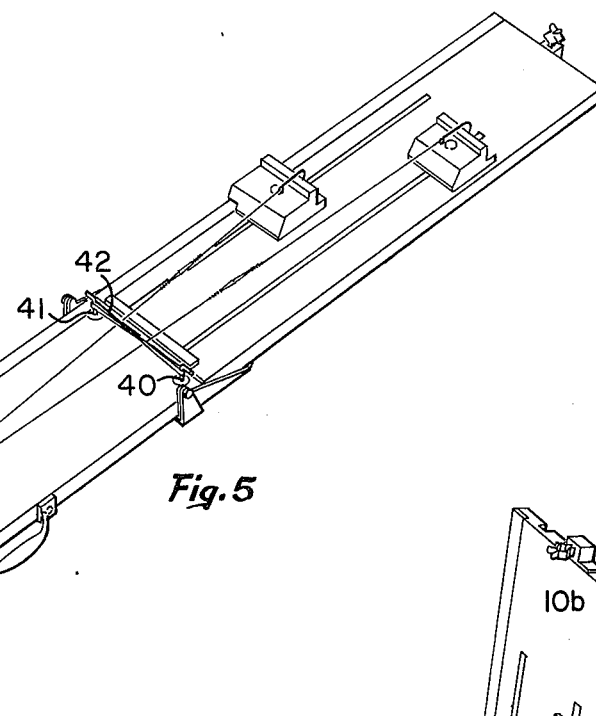
FIG. 5 is a perspective view of a foldable leader tender in an extended condition.

The device of FIG. 4 is illustrated in an extended position in FIG. 5. The device has a pair of posts 40 and 41 having an elongated leader retaining member 42 therebetween to place tension on the leaders when the leader tender is in a completely folded condition. The elongated member 42 may be rigid, fixed or removable bar or an elastic member, such as a rubber band. The relationship of the leader retaining member 42 to the hinge means 34 between sections 10a and 10b is illustrated in FIG. 7 wherein the hinge member 34 is recessed from end 10c further than posts 40 and 41 and leader retaining member 42 so that the distance along the leader from clip 37 about leader retaining member 42 to blocks 38 and 39 is as long or longer when the leader tender of FIG. 4 is completely folded than when it is extended. Recessing hinge 34 and utilizing an elongated hinge to connect section 10b to pivot about hinge 34 provides a greater effective length in a folded condition thereby placing at least as much tension on leaders being held as when the leader tender is in an extended condition. Utilizing an elastic member for retaining member 42 is preferred since it compensates for additional tension, precluding accidental breaking of leaders, and providing an easily removable member so that leaders may be placed on or removed from the leader tender without having to be threaded beneath the retaining member. One or more permanent magnets 10d and 10e are illustrated embedded in the hinge end 10c of section 10a and mates with magnetizable metal inserts in the mating end of section 10b to lock the leader tender in an open position.

Figure 6:
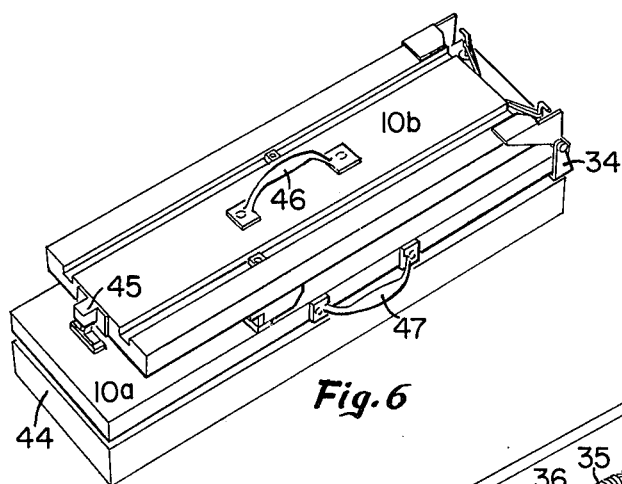
FIG. 6 is a perspective view of a folded leader tender in a folded condition wherein one section of leader tender forms the top of a fishing tackle box.

The device of FIG. 6 illustrates a preferred construction of a folded leader tender as the lid of a tackle box. Either section 10a or 10b may form the lid of a tackle box. A piano type hinge or other hinge members may hinge one edge of section 10a of the leader tender to the base portion of a tackle box 44. A latch 45 secures the folded sections 10a and 10b of the leader tender together while handle 46 provides means for lifting the whole assembly. Latch 47 latches the leader tender to the forward portion of the tackle box bottom.

The combination of the folded leader hook tender with a tackle box bottom as illustrated in FIG. 6 is significant in that leaders may be carried already snelled to hooks without becoming entangled with one another or entangled with other articles in the tackle box. The snelled leaders are conveniently located to all the material in the tackle box so that replacing of a leader on a line is conveniently done by having the leader already tied to the hook and having the tackle box with bait, bobbers, sinkers and other materials readily available.

Figure 8:
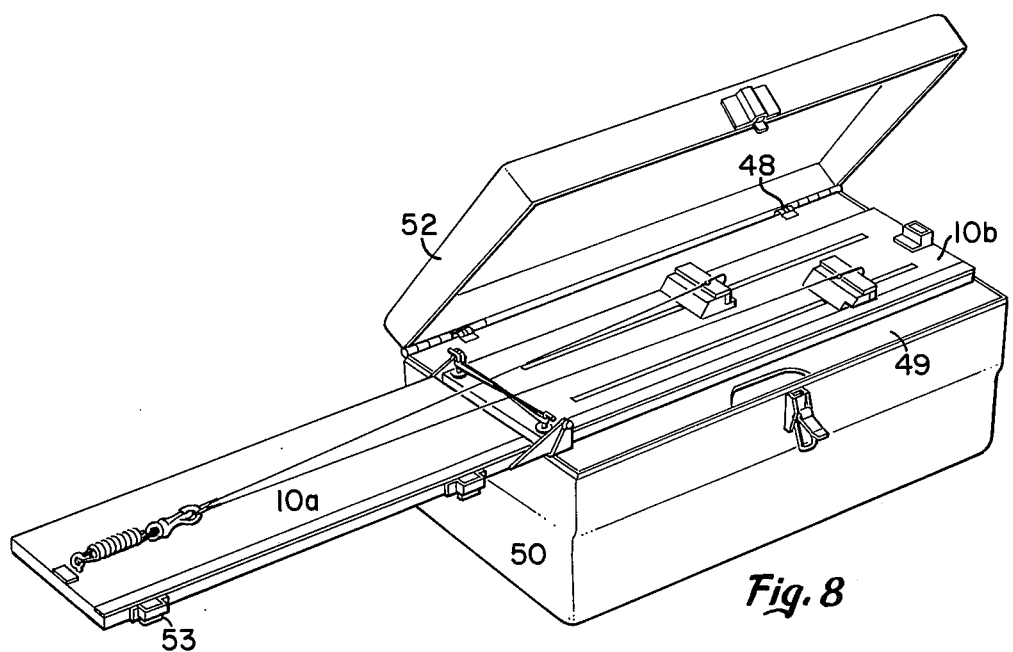
FIG. 8 is a perspective view of a folding fishing leader tender of the instant invention incorporated within a tackle box.
Figure 9:
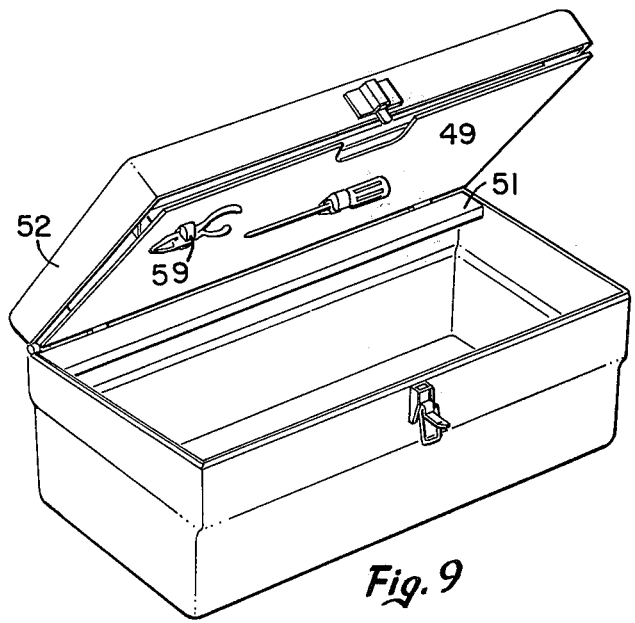
FIG. 9 is a perspective view of the tackle box of FIG. 8 illustrating the fishing leader tender folded and positioned within the tackle box bed.

An alternative combination of tackle box and leader tender is illustrated in FIGS. 8 and 9 wherein the leader tender comprises two sections 10a and 10b, as also illustrated in FIG. 4, with the sections hinged together at their narrow ends to fold out into an extended form. Section 10b is hinged along one long edge by hinge means 48 to the upper edge of the lower box portion of the tackle box. A lip 49 extends along the other longer edge of the leader tender section 10b to fully cover the lower box 50 opening. The lip 49 may rest on a support attached within the lower box 50 to support the leader tender, although the leader tender may be supported as illustrated in FIG. 9 wherein the lip 49 forms a complete base under the leader tender and has a heel strip along the longer edge adjacent the rear of the lower box 50 which bears against the rear wall of the box 50 when the lip 49 is in a lowered position.

The leader tender is illustrated in FIG. 9 in a folded condition and recessed substantially within the tackle box lid 52. The leader tender is preferably constructed with magnet means 53 attached to the base side of section 10a of the leader tender so that the magnet 53 is facing the lid 52 when the leader tender is in a folded condition. Sections 10a and 10b can be held together in a folded condition by magnet means or by latch means 45 (FIG. 6).

The bottom side of lip 49 may be equipped with tool holding means 59 to aid in the organization of the tackle box.

The advantages of the present invention are numerous. Leaders of various lengths may be held on devices of this invention and ganged hooks wherein the length from the leader looped to one hook is longer than the length looped from the other hook are readily held. The position of the spring on the base is such that the leader may be adjusted so that leaders of a particular length up to the maximum length, which is generally about 28 inches, may be readily accommodated. Furthermore, the leader tender may be equipped with legs and an anchor spike to serve as a rod holder mechanism. Since the leader tender generally provides an elongated rigid base, it can readily perform the function of a rod holder when equipped with legs and an anchor spike. Even the folding leader tender may perform this function by having a slide bolt on opposed elongated edges of the base near the hinge members so that the leader tender may be locked rigidly in an open or extended position. Telescoping legs may be readily used on a folded leader tender-rod holder combination. A further advantage of an elongated rigid leader tender is that its one side may be utilized as a rod caddy for a pair of sectioned rods. Thus, on one side of the device the leader may be orderly held while on the other side of the device rods, including reels attached thereto, may be transported.

In a further version, the leader tender may be part of the tackle box so that it is convenient to all the materials in the tackle box and forms a part thereof without the necessity of carrying additional items.

Figure 10:
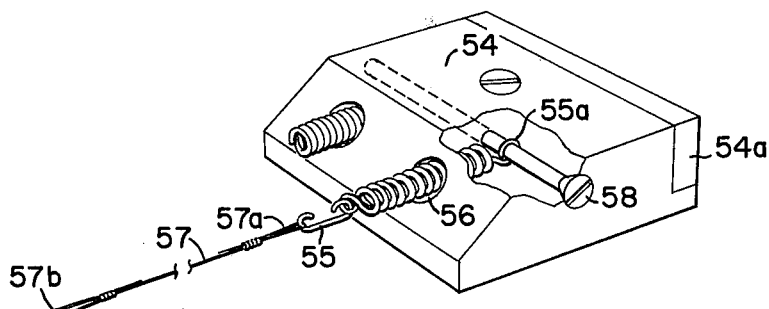
FIG. 10 is a perspective view of a movable block for a leader tender to hold leader strands.

The hook engaging block 54 of FIG. 10 illustrates a preferred construction for holding leader strands 57 having a pair of loops 57a and 57b on each end so that flies or lures can be readily attached to a fishing line which normally terminates with a metal swivel. Strip 54a may be of cork or other soft material to accommodate the sharp end of a hook, and in this feature is similar to blocks 11 and 12 of FIG. 1, for which block 54 may be substituted.

One or more spring members 55, which is illustrated as coiled tension springs, may pass through holes in the forward face of block 54 to be held in position by bolt 58 which passes laterally through the block to engage the hook 55a of spring 55. A pin or long screw may be substituted for bolt 58.

The block 54 is a particularly useful modification of the leader tenders described herein inasmuch as fishermen often prefer to switch from bait fishing to fly or lure fishing and desire to have available leader strands with looped ends so that lure or flies may be readily attached to the fishing line. Substitution of blocks 54 for those of the leader tender of FIG. 1 increases the utility of the device for lure and fly fishing.

I claim:
1. A ganged fishing hook-leader tender comprising:
    a. an elongated rigid base having a length substantially greater than its width,
    b. a pair of hook engaging blocks on said base, said blocks positioned near one end of said base and spaced longitudinally and laterally from one another, said blocks having soft hook engaging means facing the nearer end of said base,
    c. tension spring means attached near an end of said base opposite said blocks,
    d. clip means attached to said tension spring means for holding the loop of a leader.
2. The leader tender of claim 1 wherein each of said blocks is movable longitudinally.
3. The leader tender of claim 1 wherein said tension spring means have attachment means movable longitudinally along said base.
4. The leader tender of claim 1 wherein said hook engaging blocks and said spring members are longitudinally adjustable from a minimum of spacing of about eight inches to a maximum spacing of about thirty inches.
5. The leader tender of claim 1 wherein a pair of elongated legs are pivotally attached at one end of said base and rod holding means attached near the same end and a spike member attached near the other end of said base.
6. The leader tender of claim 1 wherein at least one pair of clamps are aligned longitudinally on the base face opposite said hook blocks, said clamps providing rod transport means.
7. The leader tender of claim 1 wherein said base is sectioned near its midpoint and hinged to provide a foldable leader tender.
8. The leader tender of claim 7 wherein one section is hinged along an elongated edge to a tackle box bottom.
9. The leader tender of claim 7 wherein a lateral leader retaining member is located adjacent the hinged edge of said base.
10. The leader tender of claim 7 wherein said hinge is offset from said hinged edge.

* * * * *